(12) United States Patent
Wen et al.

(10) Patent No.: US 10,214,854 B2
(45) Date of Patent: Feb. 26, 2019

(54) METHOD OF DYEING KNITTED FABRICS, AND FABRIC AND VAMP FABRIC WITH PREDETERMINED COLOR USING THE SAME

(71) Applicant: LONG JOHN TSUNG RIGHT INDUSTRIAL CO., LTD., Pei-Tou, Chang-Hwa (TW)

(72) Inventors: Wen-Tsao Wen, Chang-Hwa County (TW); Yu-Chang Wen, Changhua County (TW)

(73) Assignee: LONG JOHN TSUNG RIGHT INDUSTRIAL CO., LTD., Pei-Tou Chang-Hwa (TW)

( * ) Notice: Subject to any disclaimer, the term of this patent is extended or adjusted under 35 U.S.C. 154(b) by 178 days.

(21) Appl. No.: 15/363,452

(22) Filed: Nov. 29, 2016

(65) Prior Publication Data
US 2018/0010293 A1    Jan. 11, 2018

(30) Foreign Application Priority Data
Jul. 6, 2016    (TW) .............................. 105121410 A

(51) Int. Cl.
*D06P 1/02*    (2006.01)
*D06P 5/20*    (2006.01)
*D06P 1/00*    (2006.01)

(52) U.S. Cl.
CPC .......... *D06P 5/2077* (2013.01); *D06P 1/0016* (2013.01)

(58) Field of Classification Search
CPC .......... D06M 11/42; D06M 15/03; D06P 1/34; D06P 1/36
See application file for complete search history.

(56) References Cited

PUBLICATIONS

English abstract (Jul. 24, 2018) of the Patent No. KR 20110089686 A.*
English Abstract of the Patent No. KR 201189686 (Feb. 1, 2010).*

* cited by examiner

*Primary Examiner* — Eisa B Elhilo
(74) *Attorney, Agent, or Firm* — Muncy, Geissler, Olds & Lowe, P.C.

(57) ABSTRACT

A method of dyeing knitted fabrics and fabric and vamp fabric with predetermined color using the same are provided. The method includes steps of: providing a plain knitted fabric; entirely spray dyeing the fabric by dye liquor containing nano-particles through the printing and spraying process; executing a high temperature process or a steam process of a thermally drying process to the dyed knitted fabric so that the nano-particles can attach into the fabric of the knitted fabric, and forming the knitted fabric with the predetermined color after the knitted fabric is dyed. The fabric and the dyeing method provided can therefore reduce the production of sewage effectively.

11 Claims, 6 Drawing Sheets

METHOD OF DYEING KNITTED FABRICS, AND FABRIC AND VAMP FABRIC WITH PREDETERMINED COLOR USING THE SAME

CROSS-REFERENCE TO RELATED APPLICATION

This application claims priority from Taiwan Patent Application No. 105121410, filed on Jul. 6, 2016 in the Taiwan Intellectual Property Office, the content of which is hereby incorporated by reference in its entirety for all purposes.

BACKGROUND OF THE INVENTION

1. Field of the Invention

The present invention relates to a fabric dyeing technique, particularly, a knitted fabric dyeing method which effectively reduces the production of sewage. The present invention also particularly relates to the fabric and the vamp fabric with predetermined colors manufactured by the method.

2. Description of the Related Art

After being knitted, a piece of fabric will mostly go through a dyeing process to impart a predetermined color to the fabric for further application or enhancing its beauty.

The commonly known dyeing process is to immerse the fabric in a vat under high temperature and high pressure conditions for a predetermined period of time. After the dyeing process, the fabric undergoes a water washing process. Consequently, the foresaid process produces a large amount of sewage which causes the pollution to the environment. In addition, if sewage treatment is necessary, the manufacturing cost is therefore undoubtedly increased.

For these reasons, the inventor of the application designs a method of dyeing knitted fabrics and provides a piece of fabric and a piece of vamp fabric with a predetermined color to improve the current technique and to further its practices in the industry as well.

SUMMARY OF THE INVENTION

To solve the problems, the present invention is to provide a method of dyeing knitted fabrics, and fabric and vamp fabric with predetermined color using the same to improve the current process.

To fulfill the purpose, the invention provides a method of dyeing knitted fabrics, including following steps: providing a fabric with plain color; entirely spray dyeing the fabric through the printing and spraying process by a dye liquor containing nano-particles, which includes dye nano-particles, dispersants, auxiliaries, or combinations thereof; executing a high temperature process or a steam process of a thermal process to the dyed knitted fabric so that the nano-particles can attach into the fibers of the knitted fabric; and forming the knitted fabric with the predetermined color after the knitted fabric is dyed.

Preferably, the contents of the dye liquor containing nano-particles include 0.5 to 40 wt % of the dye nanoparticles, 5 to 80 wt % of the dispersants, and 1 to 40 wt % of the auxiliaries.

Preferably, the thermal process after spray dyeing the fabrics includes the following step: executing the thermal process at the temperature ranged from 110° C. to 200° C. in a time range from 1 minute to 180 minutes with or without an additional 0.1 psi to 15 psi steam depending on the situation.

The purpose of this invention is also to provide a fabric with a predetermined color. The fabric includes a knitted fabric and a dye material. Wherein, the dye material is the dye liquor containing nano-particles, by which the knitted fabric is spray dyed entirely through the printing and spraying process followed by a high temperature steam process so that the nano-particles can attach into the fibers of the knitted fabric, wherein the dye liquor containing nano-particles includes dye nanoparticles, dispersants, auxiliaries, or combinations thereof.

Preferably, the contents of the dye liquor containing nano-particles include 0.5 to 40 wt % of the dye nanoparticles, 5 to 80 wt % of the dispersants, and 1 to 40 wt % of the auxiliaries.

Preferably, the spray dyed knitted fabric can be processed thermally at the temperature ranged from 110° C. to 200° C. in a time range from 1 minute to 180 minutes with or without an additional 0.1 psi to 15 psi steam depending on the situation.

The purpose of this invention is also to provide a vamp fabric for a footwear. The vamp fabric comprises a knitted fabric and a dye material. Wherein, the knitted fabric is acquired after the processes of knitting and desizing. The dye material is the dye liquor containing nano-particles, by which the knitted fabric is spray dyed entirely through the printing and spraying process followed by a thermal process at the temperature ranged from 110° C. to 200° C. in a time range from 1 minute to 180 minutes, so that the nano-particles can attach into the fibers of the knitted fabric, wherein the dye liquor containing nano-particles includes dye nanoparticles, dispersants, auxiliaries, or combinations thereof.

Preferably, the contents of the dye liquor containing nano-particles include 0.5 to 40 wt % of the dye nanoparticles, 5 to 80 wt % of the dispersants, and 1 to 40 wt % of the auxiliaries.

Embodiments are described below in detail in conjunction with the attached drawings to illustrate the technical features of the present invention, so that one skilled in the art can understand the purpose, the technical features, and the advantages of the present invention.

DESCRIPTION OF THE PREFERRED EMBODIMENTS

Figure 1:
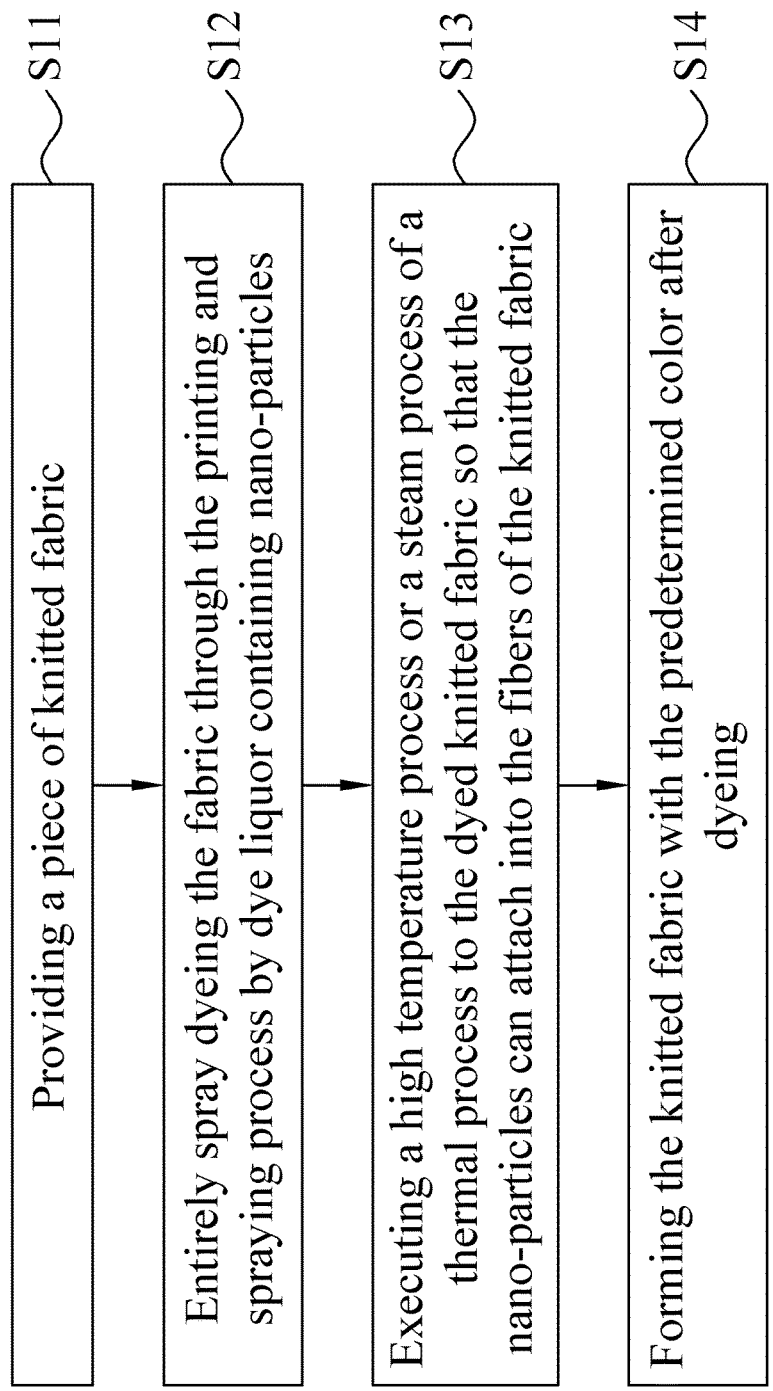
FIG. 1 is the flow chart showing the process steps of the knitted fabrics dyeing method according to the present invention.

The present invention has been described with some preferred embodiments thereof and it is understood that many changes and modifications in the described embodiments can be carried out without departing from the scope and the spirit of the invention that is intended to be limited only by the appended claims In order for the examiners to comprehend the technical features, contents, advantages, and its effects, with reference to the accompanying drawings, the present invention will be described in detail with embodiments. Since being only for the illustrative purpose, the drawings are not necessarily implying the actual size, ratio, or precise configuration. Therefore, the claims of the present invention should not be limited by the drawings' size, ratio and configuration.

Referring to the corresponding drawings, the embodiments of the knitted fabric dyeing method, the fabric with the predetermined color, and the vamp fabric of the present invention will be described hereinafter. For better understanding, the same elements will be designated by the same reference numerals in the following embodiments.

Referring to FIG. 1, which is the flow chart showing the process steps of the knitted fabrics dyeing method according to the present invention. The knitted fabric dyeing method according to the present invention includes the following steps: (S11) providing a piece of knitted fabric; (S12) entirely spray dyeing the fabric through the printing and spraying process by dye liquor containing nano-particles; (S13) executing a high temperature process or a steam process of a thermal process to the dyed knitted fabric so that the nano-particles can attach into the fibers of the knitted fabric; and (S14) forming the knitted fabric with the predetermined color after the dyeing.

Wherein, the knitted fabric can be in a plain color, such as white. In other words, the fabric is preferably undyed and is formed by knitting yarns using a shuttle loom or a knitting machine. The yarns can be a monofilament yarn, a spandex yarn, a twisted yarn, or combinations thereof. In a preferable embodiment, knitted fabric can be formed by knitting hot-melt yarns and yarns together using a knitting machine or a shuttle loom. The melting point of the hot-melt yarns can be 70° C. to 100° C. for instance.

Figure 2:
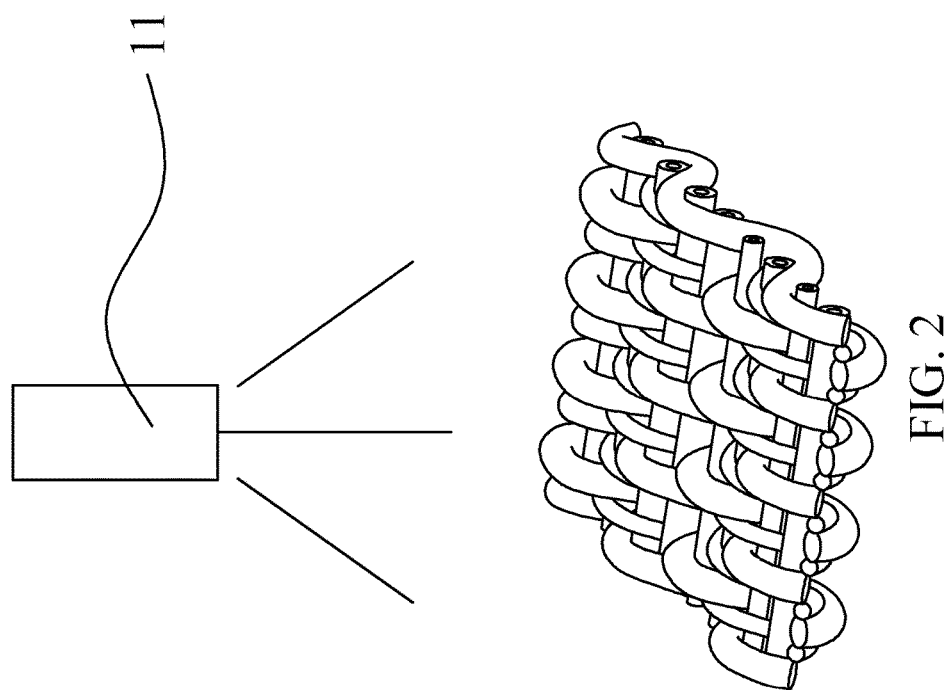
FIG. 2 is the schematic diagram showing the spraying process of the knitted fabrics dyeing method according to the present invention.

Also referring to FIG. 2, which is the schematic diagram showing the spraying of the knitted fabrics dyeing method according to the present invention. As shown in the figures, the knitted fabric provided in (S11) is spray dyed entirely through printing and spraying process in (S12).

Furthermore, the printing and spraying process can be a digital printing process or any other suitable processes, and the dye liquor used in the printing and spraying process contains nano-particles. Wherein, the dye liquor containing nano-particles may include dye nanoparticles, dispersants, auxiliaries, or combinations thereof. The dye liquor containing nano-particles may also include water. Preferably, the contents of the dye liquor containing nano-particles include 0.5 to 40 wt % of the dye nanoparticles, 5 to 80 wt % of the dispersants, and 1 to 40 wt % of the auxiliaries.

Figure 3:
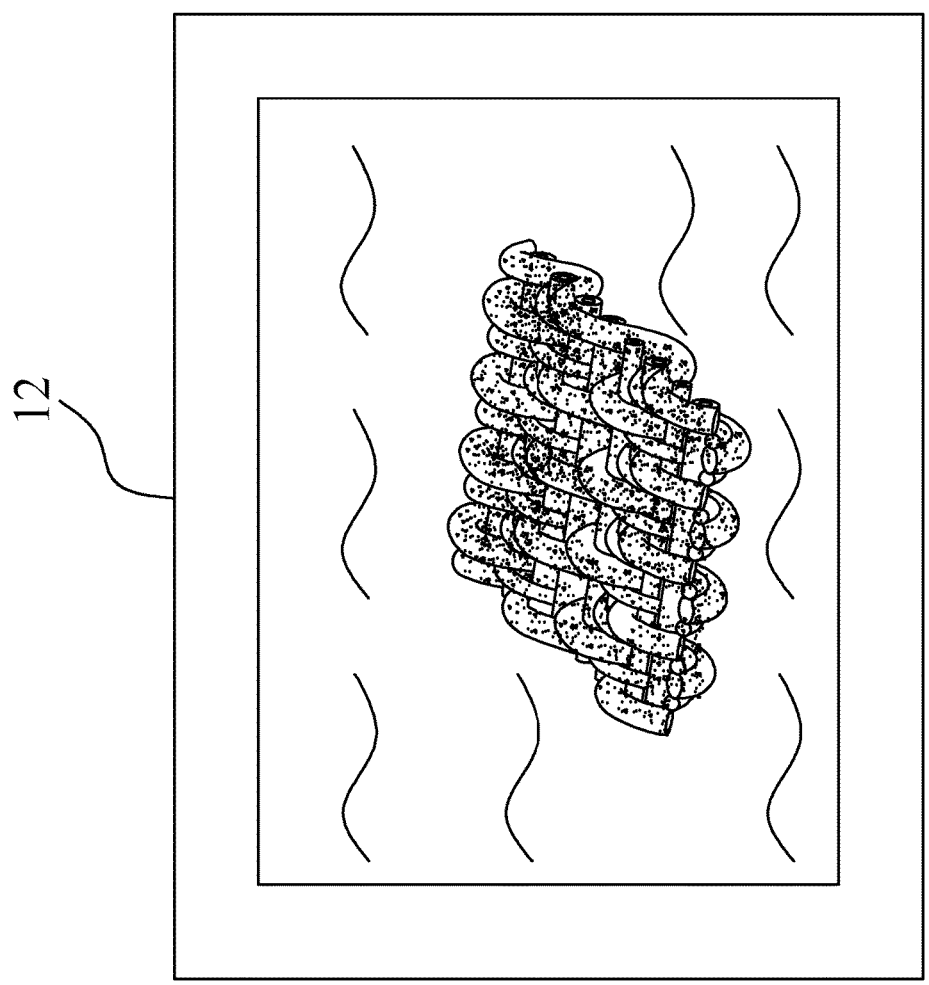
FIG. 3 is the schematic diagram showing the baking process of the knitted fabrics dyeing method according to the present invention.
Figure 4:
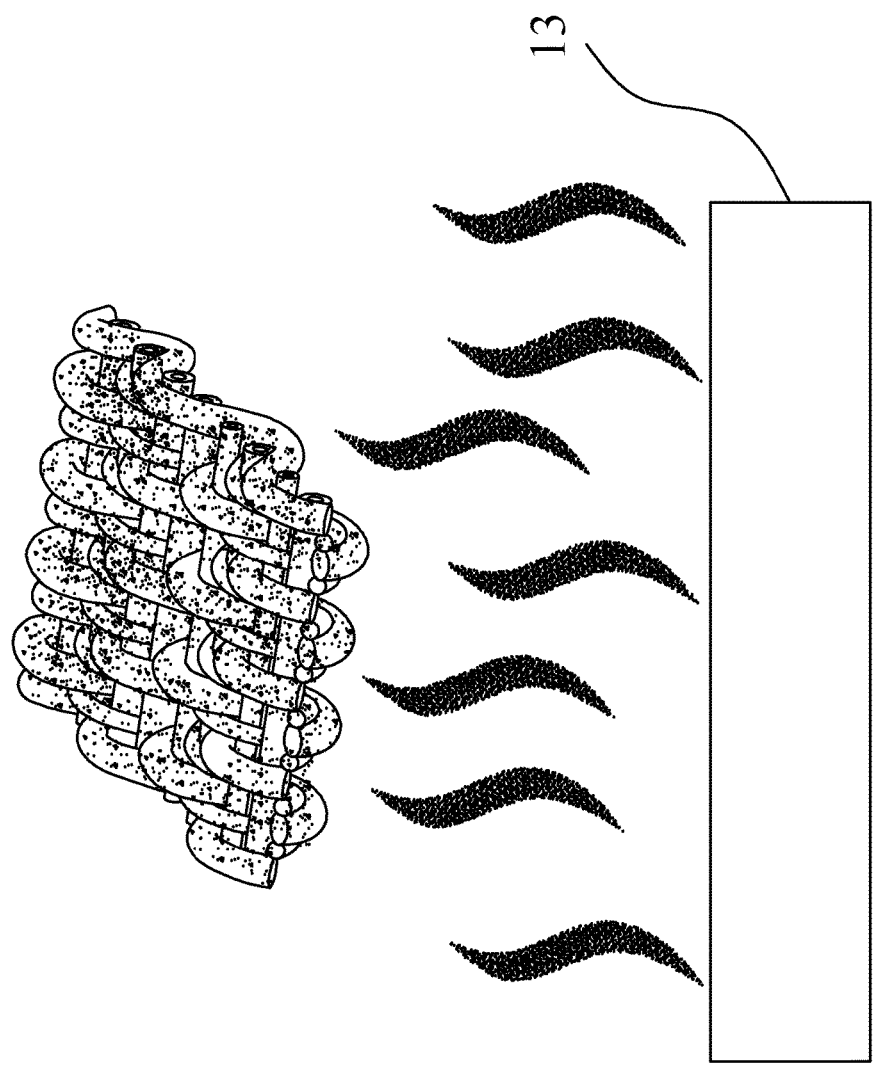
FIG. 4 is the schematic diagram showing the steam treatment of the knitted fabric dyeing method according to the present invention.

Also referring to FIGS. 3 and 4, those are schematic diagrams showing the baking and steam treatments of the knitted fabric dyeing method according to the present invention. As shown in these figures, after spray dyed in (S12), the knitted fabric is thermally treated either by the hot wind using the oven 12 or by the steam using the steamer 13.

While being thermally treated by the hot wind, the spray dyed knitted fabric is placed in the oven 12 for baking. Wherein, the baking temperature of the oven may be 110° C. to 200° C., and the baking time may vary from 1 minute to 180 minutes. In the process of the spray dyeing or the hot baking, the nano-particles would seep into the knitted fabric and attach to the fibers or a part of the fibers of the knitted fabric and, then, the color may be fixed by the hot baking.

On the other hand, after being spray dyed, the knitted fabric may be baked by the blowing of the hot air generating from a hot air machine. Preferably, the hot air may be at the temperature of 110° C. to 200° C., and the baking time may vary from 1 minute to 180 minutes.

Also notice that, during the aforementioned process, 0.1 psi to 15 psi steam can also be added to help the color fixation depending on the situation.

After the baking step of the dyeing method, the knitted fabric would have the predetermined color. The predetermined color is dyed on the knitted fabric entirely. The conventional dyeing technique is to immerse the fabric in the dye liquor. Comparing with that, the knitted fabric dyeing method of the present invention can effectively reduce or totally avoid the production of the sewage.

Moreover, the knitted fabric with the predetermined color can be further added with predetermined patterns using the printing process for further application or enhancing its beauty.

In addition, while the knitted fabric is made of yarns and hot-melt yarns, a following hot-pressing process can hot melt and resolidify the hot-melt yarns to form embossing patterns or to form the structures for supporting and reinforcement.

Figure 5:
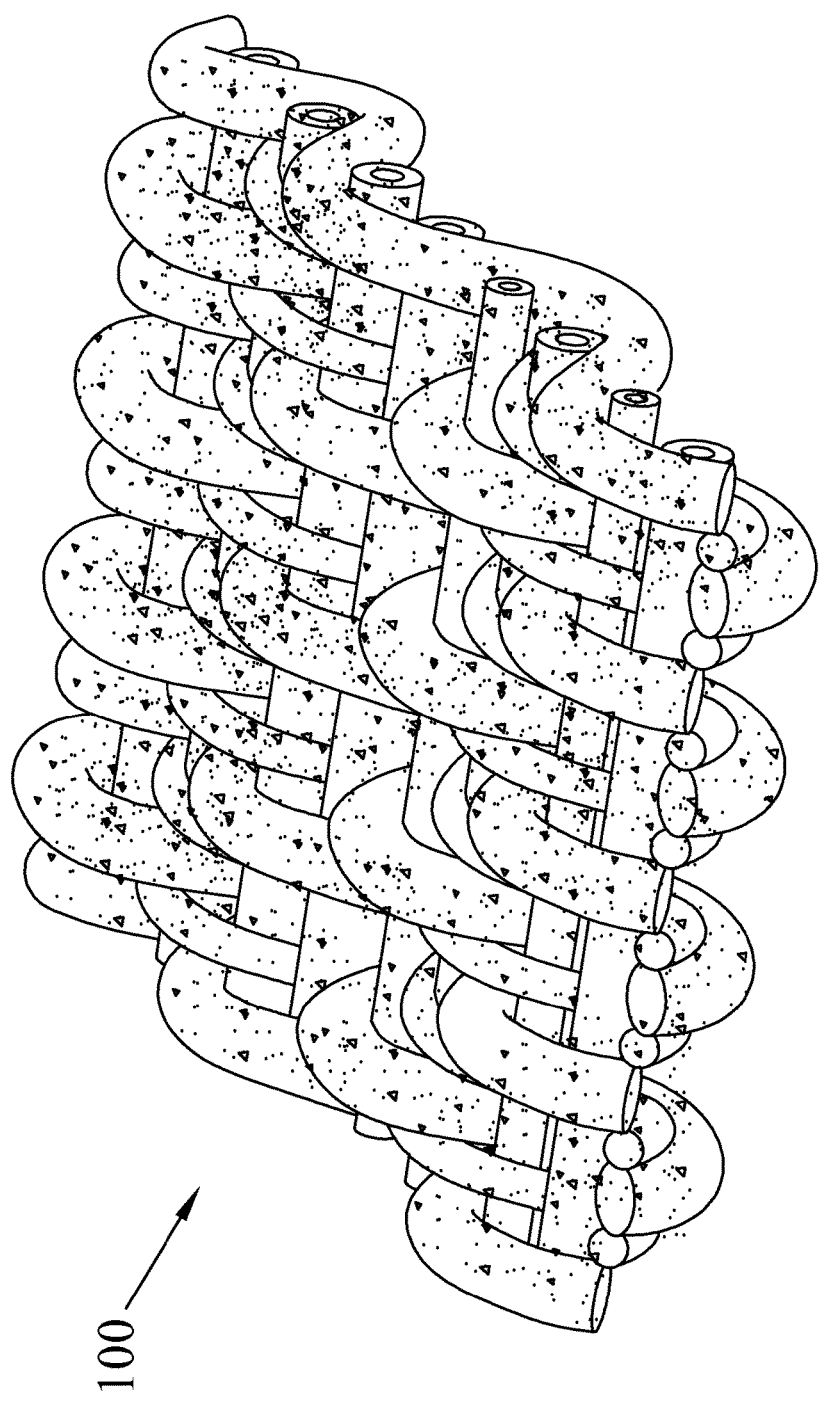
FIG. 5 is the schematic diagram showing the fabric with the predetermined color according to the present invention.

Referring to FIG. 5, it is the schematic diagram showing the fabric with the predetermined color according to the present invention. As shown in the figure, the fabric 100 with the predetermined color according to the present invention may be made by the knitted fabric dyeing method mentioned above. The fabric may be used in clothing, upholstery, fabric vamp, etc. The details about the fabric 100 with the predetermined color have been described above in the dyeing method. It is thus not necessary to repeat what is written therein.

In general, the fabric 100 with the predetermined color includes the knitted fabric and the dye material. Wherein, the dye material is the dye liquor containing nano-particles and is used to spray dye the knitted fabric entirely through the printing and spraying process. After hot baking to attach the nano-particles to the knitted fabric, the knitted fabric with the predetermined color is formed.

Figure 6:
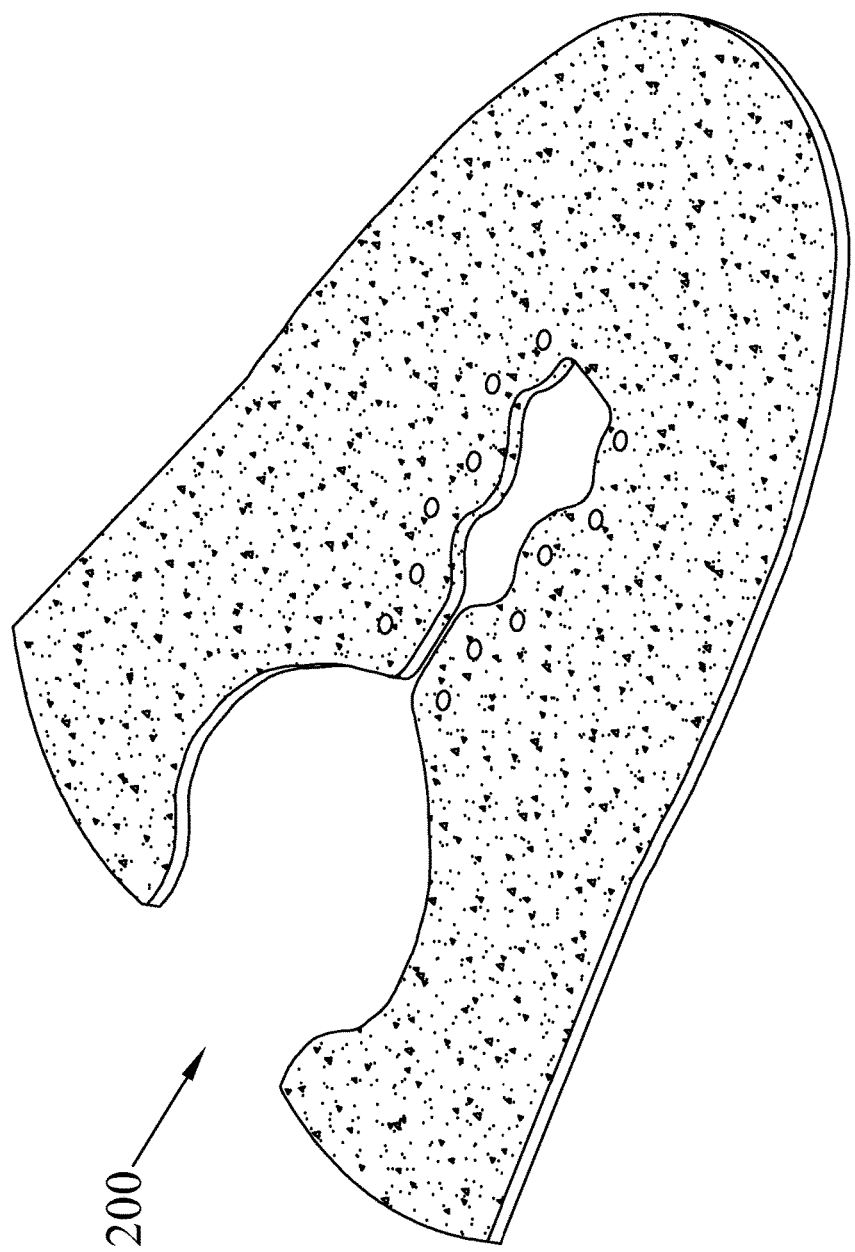
FIG. 6 is the schematic diagram showing the vamp fabric according to the present invention.

Referring to FIG. 6, it is the schematic diagram showing the vamp fabric according to the present invention. As shown in the figure, the vamp fabric 200 according to the present invention is a component used to manufacture footwears, which may be products such as sport shoes, casual shoes, etc. Wherein, the vamp fabric 200 not be made by the knitted fabric dyeing method mentioned above or the vamp fabric 200 may also be formed by cutting along the cut-line on the aforementioned fabric 100 with the predetermined color. The details about the vamp fabric 200 have been described above in the dyeing method. It is thus not necessary to repeat what is written therein.

In summary, the present invention includes the knitted fabric dyeing method, the fabric with the predetermined color, and the vamp fabric, wherein the fabric is spray dyed entirely by the dye liquor containing nano-particles through the printing and spraying process. The final product is then formed after going through the following baking process. Comparing with the conventional dyeing technique, which is to immerse the fabric in the dye liquor, the knitted fabric dyeing method of the present invention can effectively reduce or totally avoid the production of the sewage. Hence, the present invention is the breakthrough comparing with the conventional dyeing technique and has the desired effect achieved. Also, the present invention is not obvious to one skilled in the art and not disclosed before the date of filing the application. Along with its practicality, the present invention is eligible for the patent application and is applied for patent according to the patent law. Kindly requested that the present application could be approved for the purpose of encouraging inventions. Your kindness is highly appreciated.

The aforementioned contents are intended to be illustrative but not restrictive. It is also intended that the following appended claims be interpreted as including all alterations, permutations, and equivalents as fall within the true spirit and scope of the present invention.

What is claimed is:

1. A method for dyeing a knitted fabric, comprising:
   providing an undyed knitted fabric;
   spray dyeing the undyed knitted fabric by a dye liquor containing nano-particles through a printing and spraying process, the dye liquor containing nano-particles including dye nanoparticles, dispersants, auxiliaries, or their combinations thereof;
   executing a high temperature process or a steam process of a thermal process to the spray dyed knitted fabric such that the nano-particles attach into fibers of the spray dyed knitted fabric; and
   forming a knitted fabric with a predetermined color after dyeing.

2. The method for dyeing the knitted fabric of claim 1, wherein the dye liquor containing nano-particles contains 0.5 to 40 wt % of the dye nanoparticles, 5 to 80 wt % of the dispersants, and 1 to 40 wt % of the auxiliaries.

3. The method for dyeing the knitted fabric of claim 1, wherein the thermal process after spray dyeing the undyed knitted fabric further includes the following step:
   processing the spray dyed knitted fabric thermally at a temperature ranged from 110° C. to 200° C. in a time range from 1 minute to 180 minutes.

4. The method for dyeing the knitted fabric of claim 3, wherein the thermal process after spray dyeing the undyed knitted fabric further includes the following step:
   adding 0.1 psi to 15 psi steam to thermally process the spray dyed knitted fabric after spray dyeing the undyed knitted fabric.

5. A fabric with a predetermined color, comprising
   a knitted fabric; and
   a dye material, which is a dye liquor containing nano-particles, by which an undyed knitted fabric is spray dyed entirely through a printing and spraying process followed by a high temperature steam process so that the nano-particles attach into fibers of the spray dyed knitted fabric to form a fabric with the predetermined color;
   wherein the dye liquor containing nano-particles includes dye nanoparticles, dispersants, auxiliaries, or their combinations thereof.

6. The fabric with a predetermined color of claim 5, wherein the dye liquor containing nano-particles contains 0.5 to 40 wt % of the dye nanoparticles, 5 to 80 wt % of the dispersants, and 1 to 40 wt % of the auxiliaries.

7. The fabric with a predetermined color of claim 5, wherein, after being spray dyed, the spray dyed knitted fabric is thermally processed at a temperature ranged from 110° C. to 200° C. in a time range from 1 minute to 180 minutes.

8. A vamp fabric, which is used to make a footwear, comprising:
   a knitted fabric, which is acquired after processes of knitting and desizing; and
   a dye material, which is a dye liquor containing nano-particles, by which the knitted fabric is spray dyed entirely through a printing and spraying process followed by a high temperature process or a steam process of a thermal process at a temperature ranged from 110° C. to 200° C. in a time range from 1 minute to 180 minutes so that the nano-particles attach into the fibers of the knitted fabric, wherein the dye liquor containing nano-particles includes dye nanoparticles, dispersants, auxiliaries, or their combinations thereof.

9. The vamp fabric of claim 8, wherein the dye liquor containing nano-particles contains 0.5 to 40 wt % of the dye nanoparticles, 5 to 80 wt % of the dispersants, and 1 to 40 wt % of the auxiliaries.

10. The vamp fabric of claim 9, wherein the thermal process includes an additional 0.1 psi to 15 psi steam.

11. The fabric with a predetermined color of claim 7, wherein, after being spray dyed, the spray dyed knitted fabric is thermally processed with an additional 0.1 psi to 15 psi steam.

* * * * *